United States Patent [19]

Lazarz et al.

[11] 4,289,600
[45] * Sep. 15, 1981

[54] MICROPOROUS MEMBRANE MATERIALS

[75] Inventors: Christine A. Lazarz; Edward H. Cook, Jr., both of Niagara Falls, N.Y.; Lesleigh V. Scripa, West Willington, Conn.

[73] Assignee: Hooker Chemicals & Plastics Corp., Niagara Falls, N.Y.

[ * ] Notice: The portion of the term of this patent subsequent to Oct. 9, 1996, has been disclaimed.

[21] Appl. No.: 64,616

[22] Filed: Aug. 7, 1979

Related U.S. Application Data

[63] Continuation-in-part of Ser. No. 891,987, Mar. 31, 1978, Pat. No. 4,170,540.

[51] Int. Cl.³ .................. C25B 13/08; B29D 27/00; C25B 1/26
[52] U.S. Cl. .................. 204/296; 264/49; 264/127; 568/615
[58] Field of Search .................. 264/49, 127; 204/296; 568/615

[56] References Cited

U.S. PATENT DOCUMENTS

| | | | |
|---|---|---|---|
| 2,573,639 | 10/1951 | Coler | 18/47.5 |
| 3,281,511 | 10/1966 | Goldsmith | 264/49 |
| 3,391,221 | 7/1968 | Gore et al. | 264/127 X |
| 3,518,332 | 6/1970 | Sklarchuk et al. | 264/49 |
| 3,528,879 | 9/1970 | Kometani et al. | 264/127 X |
| 3,556,161 | 1/1971 | Roberts | 138/141 |
| 3,665,067 | 5/1972 | Hopkin | 264/127 |
| 3,700,627 | 10/1972 | Miller | 260/45.85 |
| 3,813,461 | 5/1974 | Murayama et al. | 264/41 |
| 3,817,772 | 6/1974 | Heit | 117/11 |
| 3,852,224 | 12/1974 | Bridgefoul | 260/2.5 M |
| 3,859,402 | 1/1975 | Bintliff et al. | 264/49 |
| 3,890,417 | 6/1975 | Vallance | 264/49 |
| 3,930,886 | 1/1976 | Mesiti et al. | 136/146 |
| 3,930,979 | 1/1976 | Vallance | 204/252 |
| 3,980,715 | 9/1976 | Szur | 260/615 BF X |
| 4,036,729 | 7/1977 | Patil et al. | 204/296 |
| 4,049,589 | 9/1977 | Sakane | 260/2.5 M |
| 4,079,084 | 3/1978 | Houghton | 260/615 BF |
| 4,125,451 | 11/1978 | Patil et al. | 204/296 |
| 4,126,535 | 11/1978 | Balko et al. | 204/296 |

FOREIGN PATENT DOCUMENTS

| | | | |
|---|---|---|---|
| 2250718 | 4/1973 | Fed. Rep. of Germany | 260/615 BF |
| 1491033 | 8/1966 | France . | |
| 1473286 | 5/1977 | United Kingdom . | |

OTHER PUBLICATIONS

"Zonyl ® Fluorosurfactant", Dupont, 3/77.

Primary Examiner—Philip Anderson
Attorney, Agent, or Firm—Howard M. Ellis

[57] ABSTRACT

Microporous membrane materials suitable for use in electrolytic cells, such as cells for the electrolysis of brine to produce chlorine, are formed from a mixture of polytetrafluoroethylene, a particulate pore forming material and an organic fluorinated lubricant. Such materials are preferably formed into a sheet, which is rolled to a desired thickness, sintered and subjected to leaching out of the pore forming material.

22 Claims, 4 Drawing Figures

MICROPOROUS MEMBRANE MATERIALS

REFERENCE TO PRIOR APPLICATION

This application is a continuation-in-part of our patent application Ser. No. 891,987, filed Mar. 31, 1978 now U.S. Pat. No. 4,170,540.

INTRODUCTION

This invention relates to microporous materials useful as membranes in electrolytic cells. It also relates to methods for the manufacture of such membranes and to the use of certain fluorinated surface active agents as lubricants for a mixture of polyfluoroethylene and a pore forming material during processing thereof to sheet or film form.

BACKGROUND OF THE INVENTION

Chlorine is produced almost entirely by electrolytic methods, primarily from aqueous solutions of alkali metal chlorides. In the electrolysis of such solutions or brines chlorine is generated at the anode and an alkali metal hydroxide, such as sodium or potassium hydroxide, is produced at the cathode, together with hydrogen. Because the anode and cathode products should be kept apart to prevent reactions between them many cell designs have been developed to accomplish such separation. These designs have generally utilized either a diaphragm or a mercury intermediate electrode to separate the anolyte and catholyte.

In diaphragm cells brine is fed continuously into the cell and flows from the anode compartment through a diaphragm, such as an asbestos diaphragm, into the catholyte compartment, which contains, for example, an iron cathode. To minimize back-diffusion and migration, the flow rate is maintained so that only part of the salt present is electrolyzed. The hydrogen ions form hydrogen gas at the cathode, leaving hydroxyl ions there. The catholyte solution, which contains sodium hydroxide and unchanged sodium chloride, is subsequently evaporated to obtain the hydroxide. In the course of such evaporation much of the sodium chloride precipitates and is separated, redissolved and sent back to the electrolytic cell, often as an aqueous solution or brine feed to the anolyte compartment. The function of the diaphragm is to maintain a desirably high level of concentration of alkali in the catholyte, to minimize the diffusional migration of hydroxyl ions into the anolyte and to maintain separation of chlorine from hydrogen and alkali metal hydroxide. The diaphragm should also have minimal electrical resistance to lower the cost of power consumed in the electrolysis.

In the mercury electrode process, the cation, usually sodium ion, after conversion to metal at the cathode forms an alloy or amalgam with mercury. The amalgam flows or is pumped to a separate chamber in which it is allowed to undergo reaction, most often with water, to form hydrogen and a comparatively strong sodium hydroxide solution containing almost no sodium chloride.

The diaphragm process is inherently cheaper than the mercury process but because it does not provide chloride-free alkali additional processing steps are necessary when purified and/or concentrated alkali metal hydroxide is the desired product.

In an effort to improve the separating ability of the separating component of diaphragm cells it has been suggested that ion-exchanging membranes should be used in place of the diaphragms. Numerous membrane materials have been suggested and tried. For example, such membranes are described in U.S. Pat. No's. 2,636,851, 2,967,807 and 3,017,338 and in British Pat. No's. 1,184,321 and 1,199,952.

Such membranes are substantially impervious to hydraulic flow. During operation brine is introduced into the anolyte compartment, wherein chlorine is liberated. Then, in the case of a cation permselective membrane, sodium ions are transported across the membrane into the catholyte compartment. The concentration of the relatively pure caustic produced in the catholyte compartment is determined by the amount of water added to this compartment from an external source and by migration of water in the cell, i.e., by osmosis and/or electro-osmosis. While operation of a membrane cell has many theoretical advantages, its commercial application to the production of chlorine and caustic has been hindered, sometimes because of erratic operating characteristics thereof. A number of disadvantages has been noted when these membranes are used, including a relatively high electrical resistance, oxidative degeneration and poor permselectivity, as well as their relatively high cost.

As an alternative to asbestos diaphragms and impermeable ion exchange membranes the industry has sought a suitable porous or microporous plastic diaphragm material. Such a material is a thin electrically conductive chemically resistant plastic sheet having the desired porosity. Numerous references may be found relating to such membrane materials. Mention may be made more particularly of the following patents which employ techniques of compression preforming followed by fritting or sintering, coagulation and deposition on a support.

French Pat. No. 1,491,033, of Aug. 31, 1966, relates to a process for manufacturing porous diaphragms by mixing a solid additive in particulate form into an aqueous dispersion of polytetrafluoroethylene in the presence of particulate inorganic fillers, coagulating the dispersion, forming the resultant coagulum into sheet form and removing the particulate solid additive from the sheet. The removable particulate additive generally is starch or calcium carbonate and is removable by immersion of the resultant sheet in hydrochloric acid. Alternatively, the additive may also be a plastic polymer or other suitable material which is soluble in an organic solvent, depolymerizable, evaporable or otherwise removable upon heating of the sheet or leaching thereof. Particulate inorganic fillers which are suitable include barium sulfate, titanium dioxide and asbestos.

U.S. Pat. No. 3,890,417, issued June 17, 1975, teaches a method of manufacturing a porous diaphragm comprising preparing an aqueous slurry or dispersion comprising polytetrafluoroethylene and a solid particulate additive, thickening the aqueous slurry or dispersion to effect agglomeration of the solid particles therein, forming a dough-like material containing sufficient water to serve as a lubricant in subsequent sheet forming operations, forming a sheet of desired thickness and removing the solid particulate additive from the sheet. The solid particulate additive can be any which is substantially insoluble in water, but which is removable by a suitable chemical or physical means. Examples given are starch and calcium carbonate.

U.S. Pat. No. 3,281,511, issued Oct. 25, 1966, discloses preparing microporous polytetrafluoroethylene resin sheets by mixing a fine polytetrafluoroethylene powder with a carrier and a readily removable filler material and rolling the resulting dough with intermediate reorientation so that the particles are biaxially oriented. The solvent is then evaporated and the polytetrafluoroethylene is sintered at above its melting temperature, followed by removal of the filler with an appropriate solvent. The carrier material is a readily vaporizable material, such as a naphtha or petroleum distillate, e.g., Stoddard solvent, which is a standard petroleum distillate having a flash point not lower than 38° C., consisting mostly of saturated hydrocarbons.

U.S. Pat. No. 3,556,161, issued Jan. 19, 1971, relates to polytetrafluoroethylene sheet materials formed by the "slipforming" process, comprising mixing polytetrafluoroethylene powder with a liquid, such as kerosene, and then sequentially working the resultant composition by the application of concurrent compressive stress and shear stress, the sequence of operations being directed so that the shear stress components are distributed substantially biaxially, resulting in planar orientation in the resulting article. As is the case with the material of U.S. Pat. No. 3,281,511, the sheet material formed is biaxially oriented.

Although these and other well known techniques may result in the production of useful "diaphragm" or microporous sheet materials, in the case of products that are desirably rich in polytetrafluoroethylene they have not been capable of producing membranes of satisfactory mechanical properties, i.e., proper porosity and good wettability.

It is an object of the present invention to provide a novel and improved method of making microporous separators suitable for use in electrolytic cells. It is also an object of the invention to provide an improved separator for use in chlor-alkali cells and fuel cells, which has a low electrical resistance and behaves like a porous medium having a desirable porosity which permits both the passage of electric current and the uniform and controllable flow of electrolyte from one compartment of a cell to another.

THE INVENTION

This invention relates to novel polymeric diaphragms or separators, a method of making such separators and the use thereof in electrochemical cells such as those of the diaphragm or membrane types of chlor-alkali cells. It also relates to improving the processing characteristics of mixes of fluorinated polymers and particulate materials, such as pore formers, by the use of fluorinated surface active agents.

In accordance with this invention a process for the preparation of a microporous electrolytic cell separator comprises (a) forming a sheet comprising a fluorocarbon polymer, a pore forming additive and a fluorinated surface active agent; (b) sintering the sheet; and (c) removing the pore forming additive to form a microporous material suitable for use as a separator for an electrolytic cell.

The invention will be readily understood by reference to the description in this specification, taken in conjunction with the drawing in which.

Figure 1:
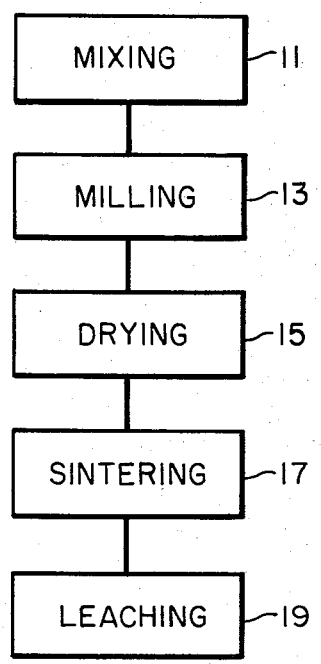
FIG. 1 is a flow diagram illustrating steps in the manufacture of the microporous separators of this invention.

In FIG. 1 the components of the mixture to be converted to sheet form, and subsequently to microporous sheet form, including sinterable polytetrafluoroethylene resin powder, particulate pore forming material and lubricant or contact promoting agent (fluorosurfactant), are mixed together in a suitable mixer or blender, such as V— or twin shell blender, in a mixing operation which is represented by numeral 11, following which the mix is milled in a milling operation 13 wherein a sheet is formed and is subsequently further milled to desired thickness. After completion of milling and removal of the finished sheet from the mill roll the sheet is dried to remove any volatile materials present which might otherwise interfere with the ensuing sintering operation. Drying step 15 is followed by sintering step 17, conducted at an elevated temperature sufficiently high (usually above, often only slightly above the crystalline melting point of the polytetrafluoroethylene) to cause fusion of the PTFE powder together at contact points. Sintering operation 17 can be carried out in any suitable fashion, e.g., in an oven, between heated plates or on heated rolls. The sintered sheets are then cooled (this step is not specifically shown), after which they are then subjected to a leaching operation 19 to remove the pore-forming material. The leaching medium may then be removed in a washing operation and the product resulting may then be dried, which operations are not shown. The sheet resulting may be rolled or otherewise converted to a form suitable for storage before use or, without storage, it may be immediately cut to microporous electrolytic cell separator form and installed in an electrolytic cell, usually after treatment to make it wettable (with or without prior removal of leaching medium and/or moisture from the pores).

Figure 2:
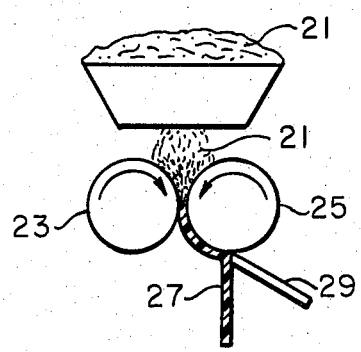
FIG. 2 is a schematic illustration of initial milling to sheet form of a mixture of polytetrafluoroethylene, fluorosurfactant lubricant and particulate pore former.
Figure 3:
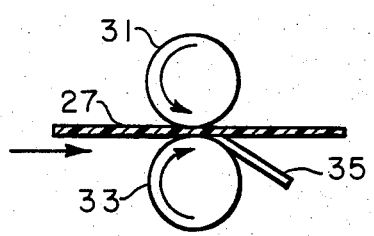
FIG. 3 is a schematic illustration of further milling of a sheet product resulting from the milling illustrated in FIG. 2.

In FIG. 2 a mixture 21 of PTFE in particulate form, particulate pore former and fluorosurfactant lubricant is fed between milling rolls 23 and 25 and forms a sheet 27 which is removed from one of the rolls (the faster moving) by cut-off knife 29. Instead of continuously removing the sheet material it may be banded on a roll and then may be cut transversely to the rolling direction and removed. In FIG. 3 the further subjection of sheet 27 to working between milling rolls 31 and 33 is illustrated and the sheet is thinned to the desired thickness and removed from roll 33 by knife 35, prior to being sintered and leached to produce a microporous separator.

Figure 4:
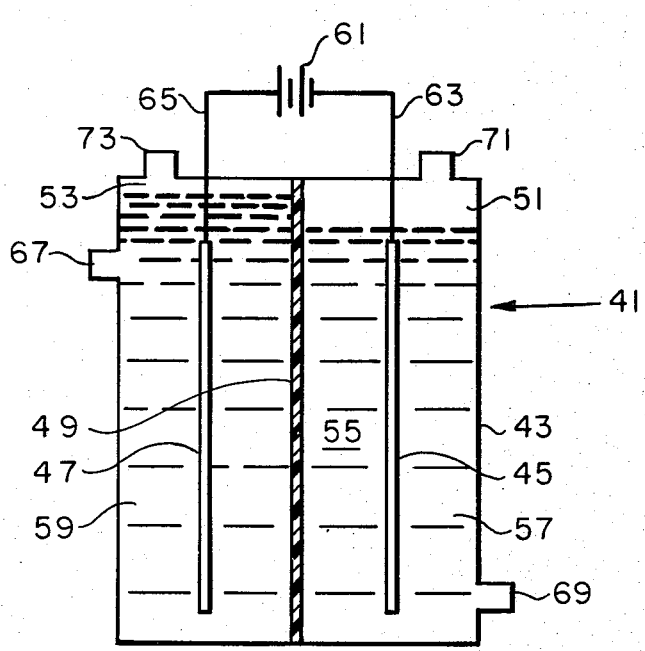
FIG. 4 is a schematic illustration of an electrolytic cell for the electrolysis of brine, with the microporous separator of this invention in place therein.

In FIG. 4 there is schematically illustrated electrolytic cell 41 for the electrolysis of brine. The cell shown includes shell body 43, anode 47, cathode 45 and microporous separator or diaphragm 49 of the present invention (separating the cell into anolyte compartment 53 and catholyte compartment 51), with electrolyte 55 therein comprising anolyte 59 and catholyte 57. A hydrostatic head is provided, represented by the greater height of the anolyte, to promote brine flow toward cathode 45. A source of direct current 61 is connected to the electrodes by means of conductors 63 and 65. Sodium hydroxide solution produced at the cathode is withdrawn through exit 69 and brine is added through inlet port 67. Chlorine is removed through outlet 73 and hydrogen is taken off at outlet 71. Water and/or sodium hydroxide solution may be added through line 69 on initial start-up or during operation of the cell. If desired, separate lines may be included for such additions. The representative cell shown may be replaced by a diaphragm or membrane cell in which the present separator is used instead of the diaphragm or membrane.

The anode of the cell illustrated, when such cell is employed for the manufacture of chlorine and caustic, will be conductive and electrolytically active, preferably being graphite or metallic and more preferably having a valve metal substrate, e.g., titanium, with a coating thereon of a precious metal, precious metal oxide or other electrocatalytically active corrosion resistant material, e.g., ruthenium oxide, platinum or a mixture thereof. Instead of a two-compartment cell, as illustrated, multicompartment cells may be utilized, having one or more buffer compartments, with additional separator sheets between them. The illustrated cell is a simple one and the invention is usually preferably applied to cells of conventional diaphragm cell design or alternatively, of filter press form, wherein a plurality of individual frames is utilized. In operation of the cell direct current is passed between the electrodes, causing the generation of chlorine at the anode, generation of hydrogen at the cathode and transport of brine across the separator into the cathode compartment, where the sodium ions "combine" with hydroxyl ions formed at the cathode by electrolysis of water, making sodium hydroxide solution.

The improved separator of this invention is microporous and of a fluorine-containing polymer. While other fluorocarbon polymers may be used, polytetrafluoroethylene (PTFE) has been found to have the most desired chemical inertness and electrical conductivity for the purpose of the present invention. Suitable fluorocarbon polymers may include polytetrafluoroethylene, polytrifluoroethylene, polyvinylfluoride, polyvinylidenefluoride, polychlorotrifluoroethylene, polyfluoroethylenepropylene, polyperfluoroalkoxyethylene, and copolymers thereof. In some cases, when particular polymers are not useful alone they be blended with a major proportion of the preferred PTFE. For simplicity of description, the specification will refer to the preferred fluorocarbon polymer, polytetrafluoroethylene.

According to the present invention, a method of manufacturing a microporous diaphragm or separator comprises preparing a blend, preferably a dry blend, of polytetrafluoroethylene, preferably as a powder, and a solid particulate pore forming additive. To this dry blend is added sufficient organic fluorosurfactant (fluorinated surface active agent) lubricant to aid in the blending of the polytetrafluoroethylene and the pore former, resulting in a heavy, wet feeling, lumpy powdery mass. While the mentioned order of addition is preferred other orders may also be followed to result in the final mix. Also, instead of using powdered PTFE or other fluorine-containing polymer, such may be in slurry, dispersion or other suitable form. The described mixture is then put through a rolling mill, wherein a sheet of doughy consistency is allowed to build up on one of the rolls. Alternatively, the mixture may be extruded, either in sheet form or as a cylinder prior to milling, or it may be otherwise suitably compacted or unitized to sheet form. Such sheet may then be further rolled or otherwise suitably worked or converted to a desired thickness. The sheet material, after thinning, is sintered, very preferably at a temperature only slightly above the crystalline melting point of the polytetrafluoroethylene, and after cooling, is subjected to leaching, as by water, aqueous acid or solvent, during which operation the pore former is dissolved. This yields a microporous separator suitable for use in electrochemical cells.

The specially preferred lubricant material employed in the process of the present invention is a fluorinated surface active agent. Of such materials those preferred are nonionic and have perfluorinated hydrocarbon chains in their structure. Such materials may be considered as being of the formula $F_3C(CF_2)_mCH_2CH_2O(CH_2CH_2O)_nH$, wherein m is from 5 to 9 and n is about 11. Such a product is marketed by E.I. DuPont DeNemours & Company, Inc., under the trademark Zonyl ® FSN. Desirably, in such formula m is 7 or about 7. However, other perfluorinated poly-lower alkylene oxide glycol ethers of the type illustrated can also be employed e.g. perfluorinated polyethylene glycol, including those wherein m is from 3 to 19 and wherein n is from 6 to 19, preferably 7 to 13. Of course, the various compounds within such formulas will have the perfluoroalkyl and polyethylene oxide portions thereof so chosen as to produce a satisfactorily lubricating surface material which will be a liquid or will be sufficiently soluble, emulsifiable or dispersible in a liquid medium, such as water or lower alcohol, e.g., isopropanol, to act as a lubricant for the described mixture of fluorinated polymer and pore forming agent.

Instead of utilizing the perfluoroalkyl moiety of the formula compound or of the broader generic description given above one may employ a partially fluorinated hydrocarbon moiety or a fluorochloro or fluorobromo moiety. Generally, however, it is preferrd that the hydrocarbyl or other aliphatic lipophilic portion of the surface active agent should have at least half the hydrogens which could be present on the carbon atoms thereof replaced by fluorine atoms. Such surface active agents can be made by ethoxylation of the corresponding fluorinated alkanol, e.g., perfluoroalkylethanol. In some cases the surface active agent may be almost or completely perfluorinated. For example, it is contemplated that there may be utilized perfluoroalkanols of carbon chains of similar lengths to those mentioned above.

Instead of etheric compounds of the formula given above there may be substituted other nonionic analogues, such as esters, which can be made by polyethoxylation of a corresponding perfluoroalkylated lower carboxylic acid.

The Zonyl FSN types of fluorosurfactant lubricants for the present compositions are usually supplied in liquid form at a concentration of about 20 to 50% solids in isopropanol or isopropanol-water solution. The solvent system may be replaced by other compatible solvents and solvent mixtures but isopropanol is preferred. When water is present the weight ratio of water to isopropanol will usually be in the range of 1:1 to 1:50, e.g., 1:5 to 1:20, which ranges apply to water-ethanol systems, too.

The fluorocarbon surfactants, in the presence of the fluorocarbon resin, apparently have a tendency to orient at interfaces and to lower surface tensions more readily than hydrocarbons or hydrocarbon-based surface agents. Such fluorosurfactants also are highly stable, both chemically and thermally and accordingly are superior as lubricants for milling and other workings of mixtures of the present fluorinated resins, such as PTFE, and particulate materials dispersed therein, such as calcium carbonate or other pore formers. The present fluorosurfactants may be utilized in relatively low concentrations in the mixtures described and are found to enhance the blending of the polytetrafluoroethylene and the particulate solid pore forming additive, helping more readily to achieve uniformity of the blend and to facilitate milling of the mixture and formation of a desired sheet structure.

Instead of nonionic fluorosurfactants, cationic, anionic and amphoteric fluorosurfactants may also be employed alone or in mixture with the nonionics, although the results of uses thereof are not usually as good as corresponding results when the described nonionic fluorosurfactant is utilized alone. Exemplary of such materials are other Zonyl surfactants, sold by DuPont as Zonyl FSB (amphoteric fluorosurfactant which is a fluoroalkyl substituted betaine), Zonyl FSC (cationic tertiary amine which is a fluoroalkyl substituted quaternary ammonium dimethyl sulfate) and Zonyl FSP (anionic fluorosurfactant which is an ammonium fluoroalkyl phosphate).

In the prior art kerosene has been mentioned as an organic lubricant for the working of PTFE particle mixes and water has also been taught to be a useful lubricant. Kerosene has the disadvantage of being released during milling, which introduces a hazard to the milling operation. It has also been found that the use of kerosene limits the amount of milling possible, since the product becomes stiff and brittle after several passes. It has been noted that kerosene does not wet polytetrafluoroethylene readily, which is also a negative factor relative to the use of the present effective lubricant systems. The use of a nonionic organic fluorosurfactant lubricant, which wets polytetrafluoroethylene readily, has the advantage of permitting almost unlimited milling, enabling one to assure almost complete uniformity of the finished product. The fluorosurfactant, when used in desired proportions, is not volatilized during milling and does not create the hazardous milling conditions encountered with kerosene. It has been found that while using kerosene a static charge may build up during milling and rolling operations. An electrical discharge or spark caused by this static build-up could result in an explosion or rapid burning of the volatile kerosene. In the present invention the lubricant may be added as an isopropanol-water solution containing up to 50% by weight of the surfactant, as previously indicated. It is also noted that the amount of lubricant employed is relatively low compared to techniques utilizing kerosene, comprising from 2 to 30 percent by weight of the total blend. Preferably, the lubricant comprises from 3 to 20 percent, and more preferably from 5 to 10%. Lower percentages of lubricant may be utilized, but may result in more difficult working during subsequent rolling steps. Likewise, higher-concentrations may be utilized, but subsequent removal thereof will have to be undertaken.

The solid particulate additive material may preferably be any which is substantially insoluble in water, but which can be removed by a suitable chemical or physical means which will not damage the polytetrafluoroethylene, such as leaching wih a mineral acid, e.g., hydrochloric or nitric acids, or by volatilization or sublimation. Exemplary are starch, for example, maize starch and/or potato starch, and water insoluble inorganic materials, preferably bases or carbonates, such as calcium carbonate, colloidal alumina and metallic oxides. Alternatively, water soluble additives may be utilized, such as sodium carbonate, sodium chloride and sodium borate but when using such materials the water content of the lubricant medium will preferably be minimized. The pore forming materials should have a well defined particle size or be in such a size range. There is preferably employed a calcium carbonate formed of particles of an average diameter of between 6.5 and 150 microns (weight average). Generally the additive has particle diameters substantially all of which are within the range of from about 1 to about 500 microns. It has been found that lower average particle diameters will result in increased porosity. The amount of additive utilized will depend on the permeability or porosity desired in the final separator. Thus, the weight ratio of pore former to polytetrafluoroethylene may be, for example, from about 10:1 to 1:1, and preferably from about 5:1 to 1:1. It is desired to obtain a porosity of greater than 70%, which was difficult, using prior art techniques. However, with the present invention it has been found possible to obtain higher porosities, greater than 70 percent and even 80 percent, without much difficulty.

The polyfluoroethylene may be of any suitable molecular weight but it is considered that it will preferably be a PTFE of a molecular weight in the range of about 500,000 to 10,000,000, more preferably 1,000,000 to 5,000,000, and a particle size or diameter range of from about 10 microns to about 500 microns or higher, such as 35 to 500 microns. Such material is available from E.I. DuPont de Nemours as, for example, Teflon® TFE—Fluorocarbon Resin 6A, or Teflon TFE—Fluorocarbon Resin 7A. Surprisingly, such low average particle sizes as 35 microns and less have been found suitable for processes using the present calendering techniques, whereas such materials have previously been acceptable only for molding processes.

In some cases, it may be desirable to incorporate other components in the blend to be processed which are not removed when th rolled sheet is treated to remove the particulate additive. Examples of such components include particulate fillers, generally inorganic materials, such as titanium dioxide, barium sulfate, asbestos, graphite, or alumina. Suitably, such fillers have a particle size of, for example, less than 10 microns, and preferably less than 1 micron, e.g., 1 millimicron to 500 millimicrons. It has been found that when utilizing a nonionic fluorosurfactant in place of kerosene the polytetrafluoroethylene-particulate filler blend is much more readily rolled and will form a uniform sheet relatively quickly. Furthermore, such material is readily blended to uniformity in a preliminary mixer, such as a V-mixer. After rolling the polytetrafluoroethylene-particulate filler blend to a sheet material, it has been found possible to reduce the number of additional rollings to obtain a desired thickness. Additionally, whereas the prior art has suggested multiple rerollings of the sheet material with reorientations of 90° between successive rollings, it has been found that such reorientations and rerollings may be limited without undue loss of useful electrolytic separator properties. It has been found that excessive reorientation and rerolling, when utilizing fluorosurfactant lubricants, yields a greater pore size distribution, thus increasing the number of smaller pores, which may cause lower efficiency in chlor-alkali cell operations due to increased back migration. While the total number of voids is not significantly affected, the relative sizes of the pores are varied. Accordingly, the number of reorientation steps, i.e., repositions of the sheet at a 90° angle between passings through the rollers, should be limited, and in many instances one reorientation is sufficient to yield enough biaxial distribution of shear stresses to result in tensile strengths and other properties adequate for the proposed use of the sheet. Alternatively, such characteristics, especially strengths, may be improved by laminating or "sandwiching" a plurality of sheets together.

Thus, by the present invention it is possible to prepare a uniform blend of fluorocarbon resin and particulate filler with one or only a few blending operations and to form such blend into a sheet of the desired thickness with a lower number of rolling operations than previously required. Further, the process of the present invention enables the reproducible production of separators of uniform characteristics and properties, each having similar permeabilities. This is very desirable in the manufacture of separators for electrolytic cells.

The microporous separator of this invention may be employed in any of a variety of electrolytic cells but is preferably utilized in a chlor-alkali cell to separate the anolyte from the catholyte, thereby forming anode and cathode compartments. The cell utilized may have the walls thereof made of any of various materials, including steel, glass, bitumen or synthetic organic polymeric plastic, e.g., polyvinylidene chloride, chlorinated PVC or polypropylene. The anode is preferably of a noble metal oxide coated onto a valve metal mesh (a so-called dimensionally stable anode) and the cathode is preferably a perforated steel plate although graphite, iron and catalytic cathodes are also useful. The voltage impressed, the cell voltage, will usually be between 2.5 and 6 volts, preferably 2.5 to 5.5 volts and the current efficiency, the so-called caustic current efficiency (CCE), will be in the range of 60 to 98%. Current density is in the range of 0.1 to 0.3 amphere/sq. cm. The brine fed to the cell will have a concentration of 250 to 350 g./l. of sodium chloride and will be acidic or alkaline, of a pH of 3 to 11 and the sodium hydroxide solution taken off will be at a concentration of 90 to 210 g./l. NaOH, usually being from 100 to 160 g./l. HaOH. The kilowatt hours per electrochemical chlorine unit (kwh/e.c.u.) are in the range of 2,000 to 4,500. In such an electrolytic cell and in the operation thereof it is found that the microporous separators of this invention satisfactorily replace conventional asbestos diaphragms and prevent undue mixings of anolytes and catholytes, while allowing flow of brine toward the cathodes without unacceptably high voltage drops across the separators. The separators withstand the conditions of use in the electrolytic cell and are capable of operating for long periods of time, e.g., six months or more, in the harsh environment thereof and over the temperature ranges normally employed, e.g., 10° to 90° C.

The following examples illustrate the invention but do not limit it. Unless otherwise indicated all parts are by weight and all temperatures are in ° C.

EXAMPLES 1–3

Fifty grams of polytetrafluoroethylene powder indentified as Teflon TFE Powder 6A, from E.I. DuPont de Nemours, were blended with 247 grams of calcium carbonate, identified as Drycaflo 225 AB, from Sylacauga Calcium Products. The Teflon powder had an average diameter of 500 microns, while the calcium carbonate had a nominal size of 12.5 microns. These materials were mixed for one minute in a V-blender, after which the lubricant material was added. In Example 1 twenty-five milliliters of Zonyl FSN fluorosurfactant were added. In Example 2, 50 milliliters of Zonyl FSN fluorosurfactant were added. In Example 3 fifty milliliters of kerosene were added. After addition of the nonionic fluorosurfactant or kerosene the blend resulting was mixed for five minutes in the described blender. The mixtures produced were then rolled between two rolls of a rubber mill. In Example 1 the material was rolled 13 times to a thickness of 18 to 20 mils, while in Example 2 it was rolled 25 times to a thickness of 11 mils. In Example 3 the material was rolled 23 times to achieve a final thickness of 26 to 27 mils. In such example, utilizing kerosene, sparks were observed during thinning operations. Such static charges were not observed using the fluorosurfactant of Examples 1 and 2.

Properties of the mixes and sheets of Examples 1–3 are compared in Table 1.

TABLE 1

| | Example 1 | Example 2 | Example 3 |
|---|---|---|---|
| Lubricant | Zonyl FSN | Zonyl FSN | Kerosene |
| Amount | 25 ml. | 50 ml. | 50 ml. |
| 1. Mix character prior to milling | Semi-dry blend, small lumps | Heavy, wet feeling, small lumps | Dry blend, small lumps |
| 2. Ability to form a sheet after first pass through mill | Medium, sample mills in small pieces which readily accept sheet form | High, material transforms into a doughy sheet | Low, sample remains powdery and crumbly, needs much working to form a sheet |
| 3. Ability to mill in successive thinnings | Modest, some tearing noted | Excellent, mills readily | Modest, some cracking noted |
| 4. Ability to cross mill (90° turn) | Not cross milled | Excellent, no hesitation in rollers, uniform sheet results | Low, sample is stiff difficult to mill, as rollers bind |
| 5. Ability to mill in successive thinning passes after cross milling | Medium, sample is flexible, with some tearing of sheet noted along with rough edges | Excellent, no resistance offered to milling, uniform sheet results | Very low, sample becomes stiff and brittle and has high tendency to break |

The sheet materials, after thinning to the indicated thicknesses, were dried in stepwise fashion at temperatures from 100° C. to 250° C. progressively, to remove all of the volatile components of the fluorosurfactant material and the kerosene. After drying thoroughly, the temperature was gradually increased to one in the range of from 340° to 360° C. to sinter the polytetrafluoroethylene particles. The sintering temperature was maintained for a period in the range of from 90 to 210 minutes. After cooling to room temperature the sintered polytetrafluoroethylene sheet was then leached successively with a dilute hydrochloric acid solution and with a dilute nitric acid solution to remove the calcium carbonate. After rinsing with water and a series of additional leaching and rinsing steps (3 each) of the same types, the microporous polytetrafluoroethylene separator was tested for porosity by use of a mercury intrusion technique. Porosities of 80.3%, 86.3% and 80.6% were found for the products of Examples 1 through 3 respectively. These examples demonstrate that a product of equivalent porosity may be obtained utilizing less fluorosurfactant than the quantity of kerosene of Example 3, and that an increased porosity is obtainable when utilizing the same amount of fluorosurfactant as kerosene. The examples also demonstrate improved processing capability when the fluorosurfactant lubricant is employed.

EXAMPLE 4

The sheet materials formed in accordance with Examples 1-3 were tested in a chlorine cell. The examples were used in a standard two compartment glass mini-cell operated between 85° and 95° C. The anolyte circulated was an acidified brine at a pH of 4.0. The catholyte was initially 100 grams per liter sodium hydroxide. The initial voltage for the cell was determined at 0.23 ampere/sq. cm. and at the indicated caustic strengths. The cell was operated and the cell voltage was determined at various times and the caustic current efficiency was calculated. The results of this experiment are illustrated in Table 2.

TABLE 2

|  | 120 g./l. NaOH | | 150 g./l. NaOH | |
| --- | --- | --- | --- | --- |
|  | % CCE | Voltage | % CCE | Voltage |
| Ex. 1 mat'l. | 80.5 | 3.47 | 68.0 | 3.42 |
| Ex. 2 mat'l. | 63.5 | 3.26 | 43.0 | 3.27 |
| Ex. 3 mat'l. | 82.5 | 3.95 | 69.0 | 3.80 |

EXAMPLES 5-7

Fifty grams of polytetrafluoroethylene powder identified as Teflon TFE-Fluorocarbon Resin 7A, from E.I. DuPont de Nemours & Co., Inc., were blended with calcium carbonate and varying amounts of Zonyl FSN fluorosurfactant. The calcium carbonate had a particle size range of from 61 to 74 microns, while the PTFE had an average particle size of 35 microns. Porosities were measured for Examples 5 and 6, and all samples were tested in a glass mini-cell, as described in Example 4. The results of these tests are set forth in Table 3.

TABLE 3

|  | Example 5 | Example 6 | Example 7 |
| --- | --- | --- | --- |
| Zonyl FSN | 65 ml. | 75 ml. | 100 ml. |
| Calcium Carbonate | 309 g. | 247 g. | 247 g. |
| PTFE | 50 g. | 50 g. | 50 g. |
| Milling Steps | 23 | 19 | 21 |
| Thickness | 0.4 mm. | 0.5 mm. | 0.2 mm. |
| Posority (%) | 87.0 | 84.6 | — |
| CCE (%) at 120 g./l. NaOH | 81.5 | 87.0 | 73.5 |
| Voltage at 120 g./l. NaOH | 3.70 | 4.05 | 3.45 |
| CCE (%) at 150 g./l. NaOH | 67.5 | 77.0 | 61.0 |
| Voltage at 150 g./l. NaOH | 3.70 | 4.02 | 3.46 |

EXAMPLES 8-13

Additional separators were prepared by the technique of Examples 1-3, utilizing a variety of different "lubricants", as set forth in Table 4. Fifty grams of Teflon TFE-Fluorocarbon Resin 6A were blended with 247 grams of Drycaflo 225 AB (unscreened calcium carbonate). The lubricants utilized were:

Examples 8-9: Zonyl FSB
Example 10: Zonyl FSC
Example 11: Zonyl FSP
Example 12: Triton X-101 (phenoxy polyethoxy ethanol surfactant, available from Rohm & Haas, Inc.)

The results, illustrated in Table 4, when compared to those of previous Example 3, demonstrate the unexpected improvement obtained by the use of the nonionic fluorosurfactant, Zonyl FSN.

TABLE 4

|  | Example 8 | Example 9 | Example 10 |
| --- | --- | --- | --- |
| Lubricant | Zonyl FSB | Zonyl FSB | Zonyl FSC |
| Amount | 50 ml. | 75 ml. | 50 ml. |
| Number of Millings: | 22 | 22 | 24 |
| 1. Mix character prior to milling | Heavy, damp feeling, small lumps | Discolored, feels damp, small lumps | Discolored, cold, small lumps, some powder, obnoxious fishy smell |
| 2. Ability to form a sheet after first pass through mill | Extremely poor, unable to form a sheet, very powdery, flaky, little cohesion | Low, sample remains powdery & crumbly, needs much working to form a fragile sheet | Low, tears readily into strips that won't adhere to one another easily, much waste |
| 3. Ability to mill in successive thinnings |  | Modest, tearing noted, puckering, build-up, bubbles | Poor, tears into strips, ragged appearance |
| 4. Ability to cross mill (90° turn) |  | Medium, tearing, bubbles, cracking noted | Medium, layering evident, puckers and tears present |
| 5. Ability to mill in successive thinning passes after cross milling |  | Very low, sample adheres severely to rollers, tearing, puckering, stiff | Low, sample becomes stiff, tears, holes develop, rippling, hesitation in rollers |

|  | Example 11 | Example 12 |
| --- | --- | --- |
| Lubricant | Zonyl FSP | Triton X-100 |
| Amount | 50 ml. | 50 ml. |
| Number of Millings: | 23 | 24 |
| Mix character prior to milling | Damp, small lumps, much powder | Dry, grainy, small lumps |
| Ability to form a sheet after first pass through mill | Poor, sample remains very powdery & crumbly, needs much working to form a very fragile sheet | Medium, sample mills into small pieces which can accept fragile sheet form |
| Ability to mill in | Poor, fractures | Modest, longitudinal |

TABLE 4-continued

| | | |
|---|---|---|
| successive thinnings | readily, delaminates | cracking, some tearing and ripping on surface of sample |
| Ability to cross mill (90° turn) | Modest, sample becomes firmer, tearing and cracking noted | Medium, sample soft and flexible, skin of sample has a tendency to blister |
| Ability to mill in successive thinning passes after cross milling | Poor, sample becomes brittle, cracking noted, tearing along edges | Medium, sample is flexible with some puckering and holes developing, liquid is seen on rollers |

These examples clearly illustrate the invention and demonstrate that the nonionic fluorosurfactants are superior lubricants for the separator compositions during milling and result in better products than other lubricants, including nonionic surfactants that are not fluorinated and fluorinated anionic, cationic and amphoteric surfactants.

The invention has been described in terms of specific embodiments and working examples, as set forth in detail herein. Alternative embodiments will be apparent to those skilled in the art in view of this disclosure and such modifications are to be considered as being within the invention, as disclosed and claimed herein.

What is claimed is:

1. A process for the preparation of a sheet material suitable for use as a separator for an electrolytic cell which comprises: (a) forming a sheet from a composition comprising a fluorocarbon polymer, a pore forming additive and a fluorinated surface active agent; (b) sintering the sheet; and (c) removing the pore forming additive, to form a microporous sheet.

2. A process according to claim 1 wherein the fluorocarbon polymer is polytetrafluoroethylene, the pore forming additive is a water insoluble particulate material and the fluorinated surface active agent is nonionic.

3. A process according to claim 2 wherein the nonionic fluorinated surface active agent is of the formula $F_3C(CF_2)_mCH_2CH_2O(CH_2CH_2O)_nH$, where m is in the range of 3 to 19 and n is in the range of from 6 to 19.

4. A process according to claim 1 wherein the polytetrafluoroethylene powder is of a particle size or mixture of sizes in the range of about 10 to 500 microns, the pore forming material is calcium carbonate of a particle size or mixture of sizes in the range of about 1 to 500 microns and is removed by acid leaching, the proportion of nonionic fluorinated surface active agent in the mix before milling is about 5 to 30% and the proportion of pore former polytetrafluoroethylene, by weight, is in the range of about 10:1 to 1:1.

5. A process according to claim 4 wherein the sheet being milled is cross-milled at least once, the acid used to remove the pore former from the sintered sheet is hydrochloric acid and the sheet is washed with water after removal of the pore former.

6. A process according to claim 5 wherein sintering is effected at a temperature in the range of 340° to 360° C.

7. A product of the process of claim 1.

8. A product of the process of claim 3.

9. A product of the process of claim 4.

10. A method of improving the milling characteristics and rolling characteristics of a fluorocarbon polymer—pore forming particulate material mixture which comprises mixing with such mixture a fluorinated surface active agent and milling the mixture resulting.

11. A method according to claim 10 wherein the fluorocarbon polymer is polytetrafluoroethylene, the pore forming particulate material is water insoluble and the fluorinated surface active agent is nonionic.

12. A method according to claim 11 wherein the pore forming additive is calcium carbonate and the nonionic fluorinated surface active agent is of the formula $F_3C(CF_2)_mCH_2CH_2O(CH_2CH_2O)_nH$, wherein m is in the range of 3 to 19 and n is in the range of 6 to 19 and milling is conducted at about room temperature.

13. In the preparation of a microporous sheet material from a fluorocarbon polymer and pore forming material the method of improving the milling and rolling characteristics of a mixture of such polymer and pore forming material which comprises incorporating in the mixture a fluorinated surface active agent which is nonionic.

14. A method according to claim 1 wherein the pore forming additive is calcium carbonate and the nonionic fluorinated surface active agent is of the formula $F_3C(CF_2)_mCH_2CH_2O(CH_2CH_2O)_nH$, wherein m is in the range of 3 to 19 and n is in the range of 6 to 19.

15. An electrolytic cell comprising an anode, a cathode and a housing for them, wherein the anode is separated from the cathode by a microporous separator which is a product of the process of claim 1.

16. An electrolytic cell according to claim 15 wherein the microporous separator is a product of the process of claim 3.

17. An electrolytic cell according to claim 16 wherein the microporous separator is a product of the process of claim 4.

18. A method of electrolyzing brine which comprises carrying out the electrolysis in the electrolytic cell of claim 15.

19. A method according to claim 18 wherein the cell is that of claim 16.

20. A method according to claim 18 wherein the cell is that of claim 17.

21. A process for the preparation of a sheet material suitable for use as a separator for an electrolytic cell which comprises: (a) mixing together polytetrafluoroethylene in powder form, a water insoluble particulate pore forming additive and a lower alkanol solution of a nonionic fluorinated surface active agent of the formula $F_3C(CF_2)_mCH_2CH_2O(CH_2CH_2O)_nH$, wherein m is in the range of 3 to 19 and n is in the range of from 6 to 19; (b) milling the mixture to form a sheet; (c) sintering the sheet, and (d) removing the pore forming particulate material.

22. In the preparation of a microporous sheet material from polytetrafluoroethylene and a water insoluble particulate pore forming material the method of improving the milling and rolling characteristics of the mixture which comprises incorporating in the mixture a perfluorinated polyethylene glycol nonionic surface active agent.

* * * * *